United States Patent [19] [11] 4,108,617
Frantz [45] Aug. 22, 1978

[54] DUAL FILTER ASSEMBLY
[75] Inventor: Virgil L. Frantz, Salem, Va.
[73] Assignee: Graham-White Sales Corp., Salem, Va.
[21] Appl. No.: 766,437
[22] Filed: Feb. 7, 1977
[51] Int. Cl.[2] .......................................... B01D 53/00
[52] U.S. Cl. ...................................... 55/162; 55/179; 55/212; 55/267; 55/389; 55/DIG. 17
[58] Field of Search ...................... 55/33, 62, 162, 179, 55/212, 213, 267, 302, 303, 316, 387, 389, DIG. 17; 210/257 M

[56] References Cited
U.S. PATENT DOCUMENTS

| | | | |
|---|---|---|---|
| 2,783,547 | 3/1957 | Bieger et al. | 55/162 X |
| 3,080,693 | 3/1963 | Glass et al. | 55/33 X |
| 3,402,529 | 9/1968 | Frantz | 55/267 |
| 3,486,303 | 12/1969 | Glass et al. | 55/162 |
| 3,659,399 | 5/1972 | Kauer, Jr. et al. | 55/33 |
| 3,831,757 | 8/1974 | Gossett et al. | 210/257 M X |
| 3,902,875 | 9/1975 | Bridigum et al. | 55/162 |
| 3,923,479 | 12/1975 | Glass et al. | 55/33 X |

Primary Examiner—Charles N. Hart
Assistant Examiner—Robert H. Spitzer
Attorney, Agent, or Firm—Wilmer Mechlin

[57] ABSTRACT

Assembly for filtering compressed gas having a pair of desiccant type filter units each alternating between filtering and regenerating cycles and one filtering while the other is being regenerated and vice versa for maintaining an uninterrupted supply of filtered gas. The filter units are adjacently or remotely mountable and so valved and controlled as to prevent substantial loss of input compressed gas during shifting of filtering from one unit to the other. Filtered gas outlets of the units are connected to opposite ends of a cylindrical purge reservoir containing intermediate those ends a floating piston for diverting to and storing on one side of the piston for subsequent purging part of the output filtered gas from each unit during the unit's filtering cycle and at the same time applying substantially constant pressure for driving gas on the opposite side of the piston from the purge cylinder's opposite end for reverse flow regeneration of the desiccant in the other unit.

11 Claims, 7 Drawing Figures 4,108,617

DUAL FILTER ASSEMBLY

BACKGROUND OF THE INVENTION

As in the patents to Muller U.S. Pat. No. 2,434,427, Parks U.S. Pat. No. 2,765,868, Bouskill U.S. Pat. No. 3,396,825 and Morrison U.S. Pat. No. 3,447,684, filter assemblies in which dual filter units alternate manually or automatically in filtering and regeneration, are commonly used for filtering fluids in installations requiring an uninterrupted output of filtered fluid. Also, in such assemblies it is not uncommon to employ a reverse flow of filtered fluid from the then filtering filter unit, either alone or supplemented by heating or otherwise, for regenerating the desiccant or other filter medium in the other, then inactive, filter unit. The present invention is directed to improvements in such filter assemblies and particularly those having molecular sieve or other desiccants for selectively adsorbing moisture or other contaminants from compressed gas.

SUMMARY OF THE INVENTION

An object of the present invention is to provide an improved dual filter assembly, dual filter units whereof have either common or individual inlet and drain valvings for, respectively, adjacent or remote relative mounting, the valvings are automatically fluid-actuated under timer control and the drain valving of each unit is delayed in closing relative to opening of its inlet valving for substantially inhibiting loss of incoming fluid in switching filtering from one unit to the other.

Another object of the invention is to provide an improved dual filter assembly for compressed gas having alternately filtering dual filter units containing a desiccant regenerable by a reverse flow of filtered gas wherein the units have outlets connected to a common purge reservoir on opposite sides of a floating piston for diverting to the reservoir during each unit's filtering cycle part of the filtered compressed gas for both storing the diverted gas for subsequent regeneration of that unit's desiccant and through the piston applying substantially constant pressure for forcing the previously stored gas on the opposite side of the piston from the reservoir for reverse flow through and regenerating the desiccant of the other unit.

An additional object of the invention is to provide an improved dual filter assembly of the type described in the immediately preceding object wherein each of the filter units in its filtering cycle diverts filtered compressed gas to the purge reservoir through a check valve, and in its subsequent regenerating cycle receives a substantially constant flow at low pressure of the previously stored gas through a restricted orifice by passing the check valve and the capacity of the reservoir is such as to accommodate in the full travel of the piston the quantity of filtered compressed gas required for the subsequent regeneration.

Other objects and advantages of the invention will appear hereinafter in the detailed description, be particularly pointed out in the appended claims and be illustrated in the accompanying drawings, in which:

FIGURE DESCRIPTION

DETAILED DESCRIPTION

Figure 1:
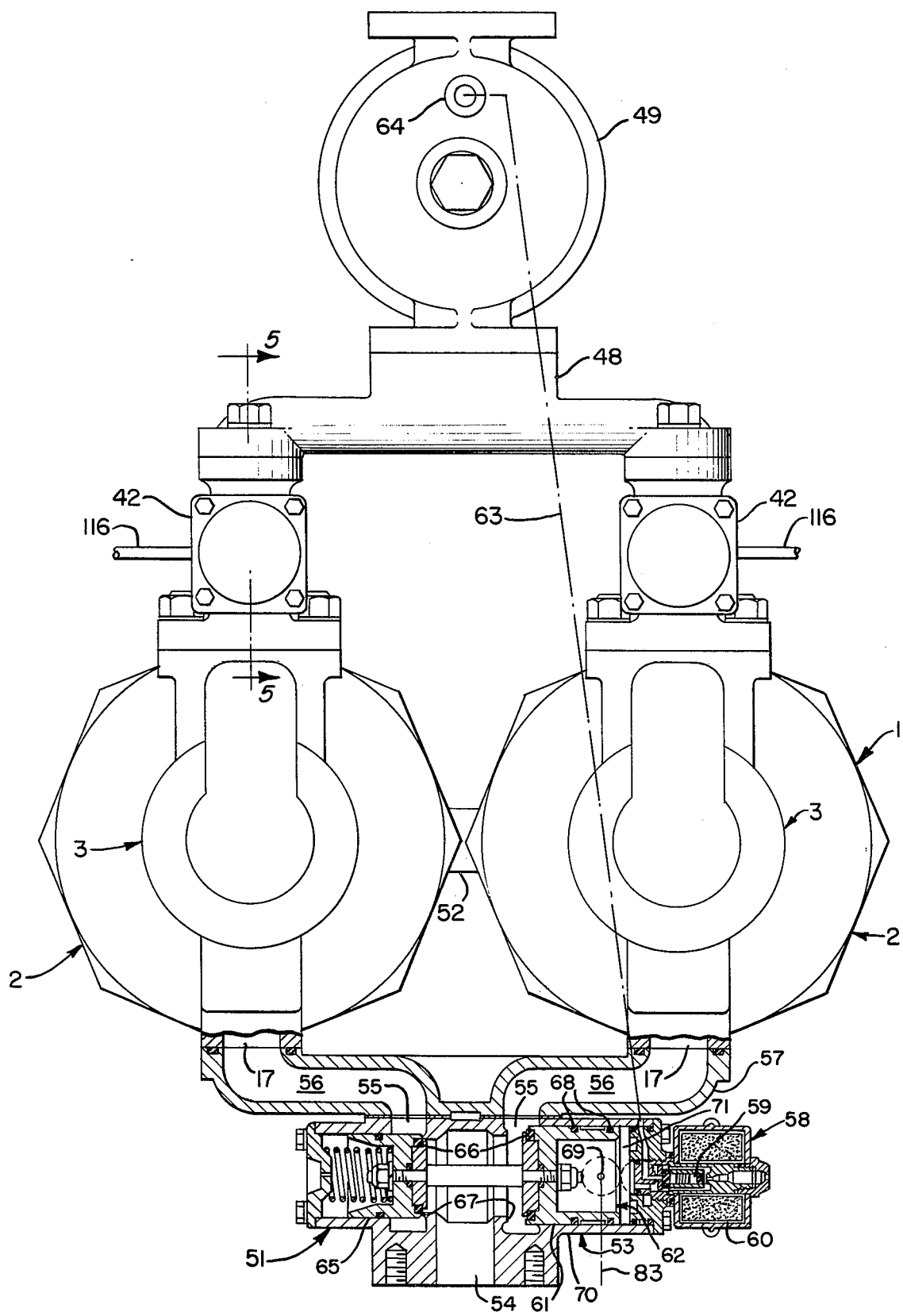
FIG. 1 is a plan view of one embodiment of the preferred dual filter assembly of the present invention, with portions broken away and shown in section to more clearly illustrate certain of the details of construction.
Figure 2:
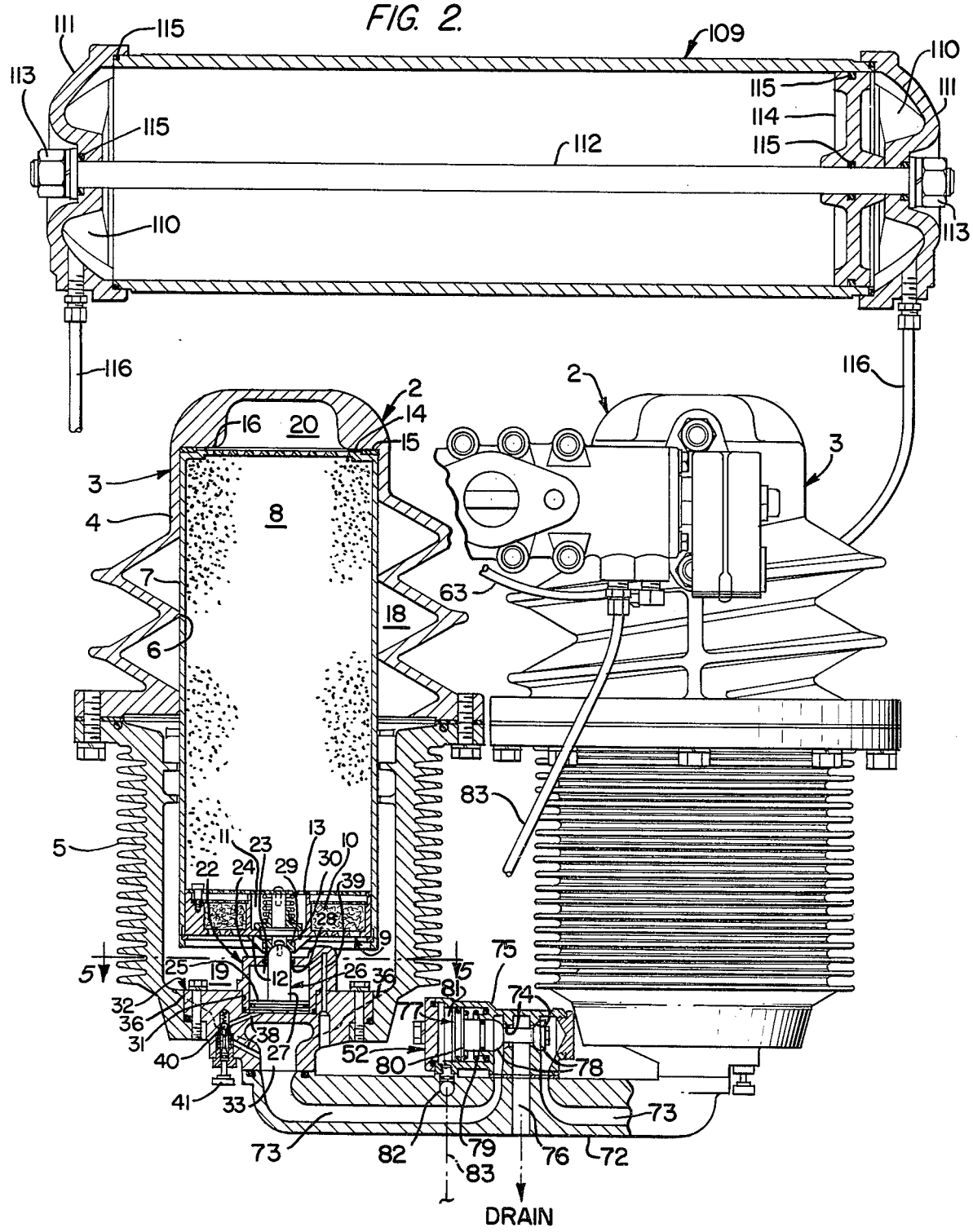
FIG. 2 is a front elevational view of the embodiment of FIG. 1 with the common purge reservoir added and the reservoir, one of the filter units and the common drain valve shown in vertical section.

Referring now in detail to the drawings in which like reference characters designate like parts, the improved dual filter assembly of the present invention is adapted for both vehicular and industrial use and in vehicular installations, to have its filter units mounted adjacent or remote from each other. In both of the illustrated embodiments, the improved assembly is particularly designed for use in a compressed air system of a diesel locomotive and will be so described as exemplary of the invention.

The compressed air systems of diesel locomotives ordinarily include a pair of main reservoirs (not shown) connected in series to the locomotive's compressor (not shown), and termed on the basis of their positions the No. 1 and No. 2 reservoirs. Storing, during the compressor's pumping cycles, compressed air for operating on demand the locomotive's air brakes and other air-operated devices, the main reservoirs, by their surface exposure to ambient air, appreciably cool the hot gas received from the compressor and, in so doing, perform the function of aftercoolers with which compressors usually are equipped in lesser vehicles, such as trucks, buses and rapid transit cars. Since all desiccants, even molecular sieves, decrease in their adsorption efficiency with increase in the temperature of the gas or other fluid flowing therethrough, particularly in the range above around 100° F (37.7° C), if, as in the improved assembly, a desiccant is employed for selectively adsorbing moisture or other undesired component or contaminant from the compressed gas, advantage can be taken of the cooling effect of the main reservoirs by installing the filter assembly in the system beyond the No. 2 reservoir.

Thus, in the exemplary diesel locomotive installation, preferably connected for preliminary cooling to the No. 2 main reservoir rather than directly to the compressor, the improved dual filter assembly of the present invention has a constantly available supply of compressed gas in the pressure range between maximum and minimum reservoir pressures and in turn is called upon or required to make available on demand to air brakes and other gas-operated devices a constant, continuous or uninterrupted supply or output of dehydrated or otherwise suitably filtered, decontaminated or conditioned compressed gas. To meet this demand or requirement, the improved dual filter assembly, designated as 1, is a desiccant-type filter assembly comprised of dual, twin or a pair or plurality of alternately filtering, operating or active filter units 2, alternately connected to the reservoir or other source of compressed gas for filtering the gas therefrom and each or individually alternating between filtering and regenerating cycles so that one unit is filtering when the other is being regenerated and vice versa.

Substantially identical or counterpart, each of the preferred filter units 2 is comprised of a vertically disposed, generally cylindrical housing or casing 3 divided vertically into releasably connected upper and lower parts 4 and 5, respectively, and having a suitably cylindrical vertical or axial bore 6 exposed on separation of the parts 4 and 5 for slideably receiving or seating a canister 7 containing a bed or column 8 of a desiccant. Preferably in the form of molecular sieve beads having a selective adsorption suitable for the intended use, the desiccant bed or column 8 in the illustrated embodiments fills the canister 7 except for the lower portion thereof, which is occupied by a scrubber or scrubbing device 9 having a suitably stainless steel wool annular pad 10 for entrapping or removing fine oil or like particles in advance of the desiccant and a normally check valve-closed central bypass 11 for bypassing the pad in case the latter becomes clogged. Suitably removably retained and slideable vertically in the canister 7, the scrubber 9 sandwiches the pad 10 between rigidly connected or spaced bottom and top plates 12 and 13, respectively, the latter separating the pad from the desiccant bed 8 and both foraminous or perforated, the top plate in whole and the bottom plate over the area covered by the pad. The canister 7, itself, has a perforated or foraminous upper end 14 seating against and peripherally engageable through an annular sealing gasket 15 with an opposed annular shoulder 16 in the housing 3 at the upper extremity of the bore 6.

Dirty or contaminated compressed gas enters or is introduced, injected or passed into the housing 3 through an inlet 17 leading inwardly to a downwardly directed helical passage 18 in the housing's upper part 4 between confronting sides thereof and the canister 7. The cyclonic flow induced in the entering compressed gas by the helical passage 18, which centrifugally cools and separates heavier contaminants from the incoming gas, is broken up by internal baffling in the housing's lower part 5 as the gas flows past the bottom portion of the canister 7 to an underlying sump 19 in the lower part. The sump 19 collects the separated contaminants and reverses the direction of flow of the compressed gas for upward flow through the canister to an overlying outlet passage 20 in the upper end of the housing 3 leading to an outlet port 21 from which it exits or is discharged as filtered or decontaminated product compressed gas.

As mentioned in the patent application of Lanier Frantz, Ser. No. 661,307, filed Feb. 25, 1976, now U.S. Pat. No. 4,029,486, issued Oct. 4, 1977, the particles or beads of the preferred molecular sieve desiccant 8, under substantially constant exposure to gas flowing upwardly during filtering and in reverse downwardly during regenerating, abrade or rub against each other and in process produce dust which is carried off with and detrimentally affects any devices operated by the product or output gas. In that application the tendency of the desiccant particles to create dust is minimized by a pneumatic compactor, which as there illustrated, acts downwardly on a follower plate in the canister's upper end. While effective under the compressed gas pressures usually prevailing or obtaining in the truck, bus and rapid transit car installations for which it was particularly designed, the downwardly acting compactor of the Lanier Frantz application, under the higher gas pressures of diesel locomotive compressed air systems, tends by its downward pressure to disrupt the seal between the upper end of the canister and the housing and permit leakage of the gas entering the inlet 17 past the canister to the outlet passage 20. Such leakage is here prevented by the illustrated improved pneumatic compactor 22, also invented by Lanier Frantz and to be the subject of a separate patent application filed in his name. Acting upwardly against the bottom plate 12 of the scrubber 9, the improved compactor 22 not only compacts the desiccant particles, but also maintains the seal between the canister's upper end 14 and the confronting shoulder 16 in the housing 3.

Briefly, the improved pneumatic compactor 22 is comprised of a valve chamber 23 in an open-bottom cup or casing 24 in which vertically rides or slides a head 25 of a piston 26, the stem 27 of which projects upwardly through the cup's upper wall 28 and has a ball-shaped upper end 29 ball-and-socket connected to and swivelly mounting a self-aligning spider 30 and therethrough engageable with the scrubber's bottom plate 12. With the scrubber 9 then serving as an intervening floating follower, the compactor 22 is adapted to apply an upward force for compacting the desiccant within the canister 7 and through the desiccant pressing the canister against the shoulder 16. For enabling the compactor 22 to react downwardly against the housing 3, the cup is mounted in an upwardly opening, suitably cylindrical central socket 31 in a mounting block 32 seated from within the sump 19 and containing below and separate from the socket a drain port or opening 33 of the housing 3. The drain port opens onto or communicates with the sump 19 through suitably crescent-shaped apertures 34 each at the bottom of one of the sectors 35 into which the suitably conical lower part of the sump 19 is divided by radially projecting slots 36 in which seat or are received radial arms or abutments 37 of the mounting block 32 through which the block is bolted or otherwise releasably secured in the housing 3.

Connected at the bottom and top, respectively to the drain port 33 by a supply passage 38 and to atmosphere by a bleed passage 39, the valve chamber 23, during the filtering cycle of the filter unit 2 of which it is a part, is open to receive from the drain port actuating gas below the head 25 of the piston 26 for urging the piston upwardly, while eliminating resistance by back pressure to upward movement of the piston by bleeding or venting gas above the piston head to atmosphere through the bleed passage 39. Once charged or pressurized, the pneumatic compactor 22 is prevented from being accidentally discharged during a regenerating cycle of the filter unit by a check valve 40 in the supply passage 38, while adapted for intentional discharge through the same passage during a regenerating cycle by manual actuation of a plunger 41 to open or unseat the check valve.

Each of the filter units 2 has on its housing 3 as outlet valving, conveniently in a single or common fitting 42 in, at, or connected to its outlet port 21 and having a pair of check valves opening off a common extension in the fitting of the outlet port, one a primary or main outlet valve 43 for passing output gas on demand through a main outlet 44 to gas-operated devices or other users during the unit's filtering cycle, and the other a secondary or purge valve 45 for diverting part of the output gas through a secondary or purge outlet 46 for use in regenerating or purging the desiccant 8 in one of the dual units of the assembly. Of these valves, the main valve 43 closes automatically when the supply of compressed gas to the unit is shut off, for blocking back-flow of output gas. However, the secondary or purge check valve 45, while also closing at that time, includes or has associated a restricted orifice or bypass 47 for passing purge gas back to the housing 3 for reverse or backward flow through the desiccant bed 8 therein.

Despite the action of the compactor 22, there still may be a relatively small amount of dust produced by the mutual abrasion of the desiccant particles. If even this small amount is objectionable in a particular installation, its access to the gas-operated devices or other users of the filtered compressed gas is readily preventable by connecting the main outlets 44 of both of the dual filter units 2 through an outlet manifold 48 to a common fine dust filter 49, suitably of the type having a replaceable paper filter element 50, for a final filtering before the output gas is made available for the intended ultimate use.

Alike in the foregoing respects, the filter assemblies 1 of the two embodiments differ in their inlet and drain valving by which filtering is alternated between their filter units 2. In the embodiment of FIG. 1, in which the filter units are designed for mounting abreast, adjacent or in close proximity to each other, the filter units 2 can and preferably do share common inlet and drain valvings. Each of the common inlet and drain valvings 51 and 52, respectively, preferably is a double-acting valve, having a differential piston alternately gas pressure-advanced and spring-returned for alternate connection in one position to one and the other position to the other of the dual filter units 2. The common inlet valving or valve 51 has a body 53 with a single or common inlet 54 connectable to the No. 2 reservoir or other source (not shown) of unfiltered compressed gas and dual or a pair of outlets 55 each leading to one of the filter units 2 through one of a pair of separate passageways 56 in an interposed inlet manifold 57.

The preferred inlet valve 51 is equipped or fitted with a solenoid-actuated pilot valve 58 having a valve element 59 opening in response to energizing of a solenoid 60 for admitting actuating gas to the larger head 61 of its differential piston 62 and closing under an opposing spring force on de-energizing of the solenoid. For avoiding possible clogging, the pilot valve 58 preferably receives as actuating gas, filtered compressed gas taken through connecting piping 63 from a tap 64 either on the outlet manifold 48, or, as illustrated, on the fine dust filter 49 and has its solenoid 60 alternately energized and de-energized at predetermined intervals under control of a suitable timer (not shown) in the electrical circuit (not shown) furnishing power thereto. The larger head 61 and smaller head 65 of the differential piston carry or mount on confronting ends appropriately sized gaskets 66 alternately seatable against oppositely facing seats 67, both opening inwardly onto the inlet 54 and each opening outwardly onto one of the outlets 55. In retracted position connecting the inlet 17 of the right-hand filter unit 2, as viewed in FIG. 1, to the common inlet 54, the differential piston 62, on being advanced to its alternate position under the force of the actuating gas, simultaneously closes the right-hand unit and opens the left-hand unit to the inlet.

For supplying actuating gas to and bleeding that gas back from the common drain valving or valve 52, the larger head 61 of the differential piston 62 has or carries a pair of axially spaced O-rings 68 normally or in the piston's retracted position bracketing, straddling or containing therebetween a radial drilling 69 through the side wall 70 of that head's valve chamber 71. Blocked from the actuating gas by the outer or right-hand O-ring in the piston's retracted position, the drilling 69 is opened to that gas in the advance stroke of the piston 62 as soon as the right-hand or outer O-ring sweeps thereacross and remains so open until again crossed by that O-ring, in consequence, delaying action of the drain valve 52 relative to the inlet valve 51.

The companion common drain valve 52 conveniently is mounted on a drain manifold 72 having separate drain passages 73, each connected to or communicating with the drain port 33 of one of the filter units 2 and connectable through one of a pair of oppositely facing valve seats 74 in the body 75 of the drain valve to a common drain outlet 76 between and extending downwardly from the seats to the bottom of the drain manifold 72. The differential piston 77 of the drain valve 52 has a pair of opposed smaller heads or valve elements 78 straddling or bracketing and alternately seatable, each in one of the seats 74, for alternately connecting the drain ports 33 of the filter units 2 to the common drain outlet 76. The relation of the drain valve 52 to the filter units 2 is the reverse or opposite of that of the inlet valve 51, the drain valve, in the illustrated normal or retracted position in which it is held by the force of a return spring 79 on its larger head 80, closing the drain port 33 of the right-hand filter unit 2 from and opening that of the left-hand unit 2 to the common drain outlet 76. Thus, in its filtering cycle, each of the filter units 2 receives unfiltered gas at or in its inlet port 17 through its then open side of the inlet valve 51 and is blocked from draining by its then closed side of the drain valve 52, while, conversely, the other filter unit has its inlet closed and drain open and is in its regenerating cycle.

Actuating gas for the drain valve 52 is led or fed to and discharged or bled from the valve chamber 81 of the larger head 80 above or outwardly of that head through an actuating gas port 82 connected by suitable piping 83 to the drilling 69 in the inlet valve 51. Receiving actuating gas through the inlet valve 51 and only when the drilling or radial port 69 is exposed or open to the actuating gas fed to that valve, the drain valve 52 is delayed relative to the inlet valve in the shifting of its piston 77 between its alternate positions. The result of this delayed action is to delay opening of the drain 33 of each filter unit 2 until its inlet 17 is almost closed, thus enabling the dual filter assembly 1 to be automatically switched for filtering between the filter units without substantial loss of the supply of compressed gas.

Figure 3:
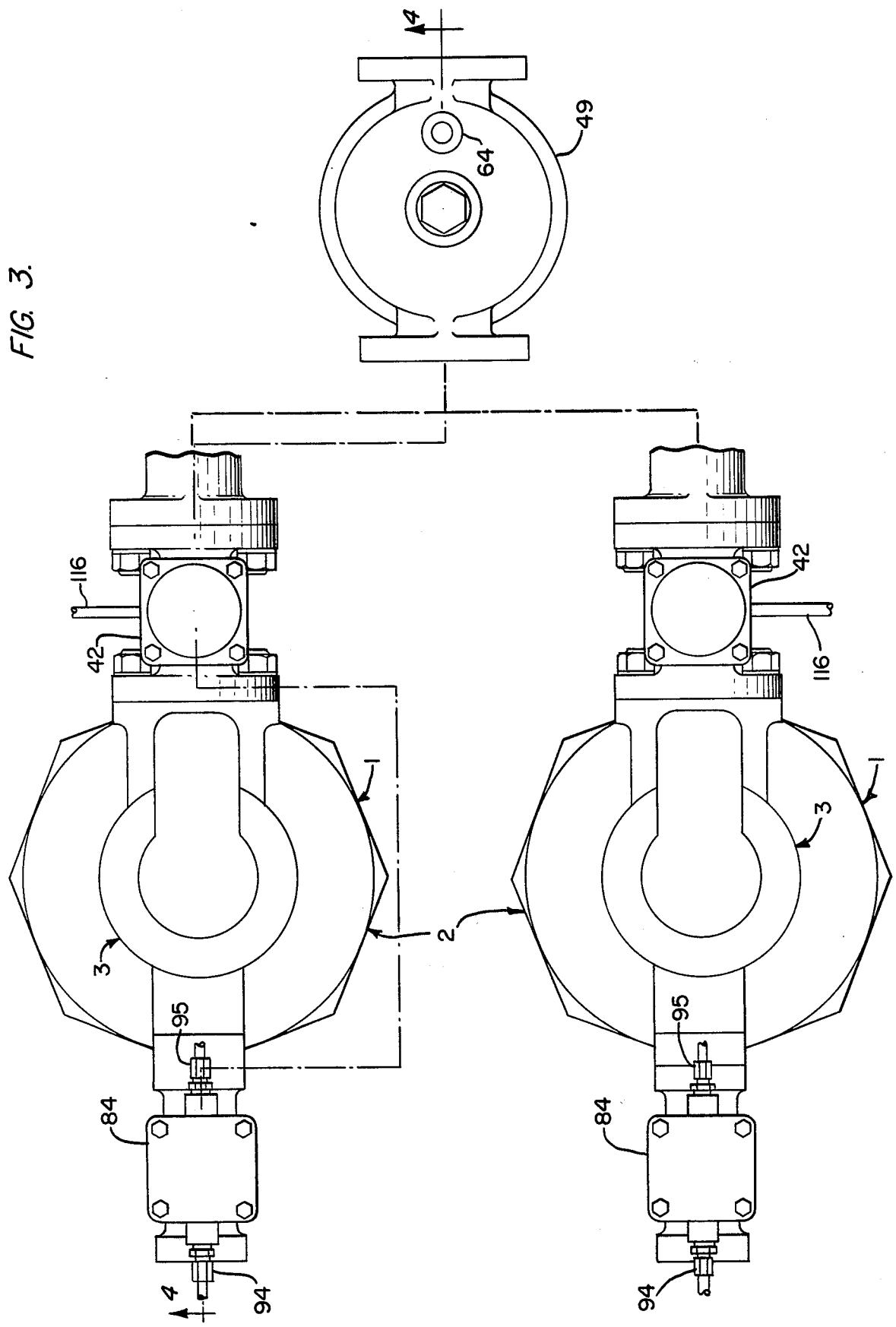
FIG. 3 is a plan view of a second embodiment of the preferred assembly.
Figure 4:
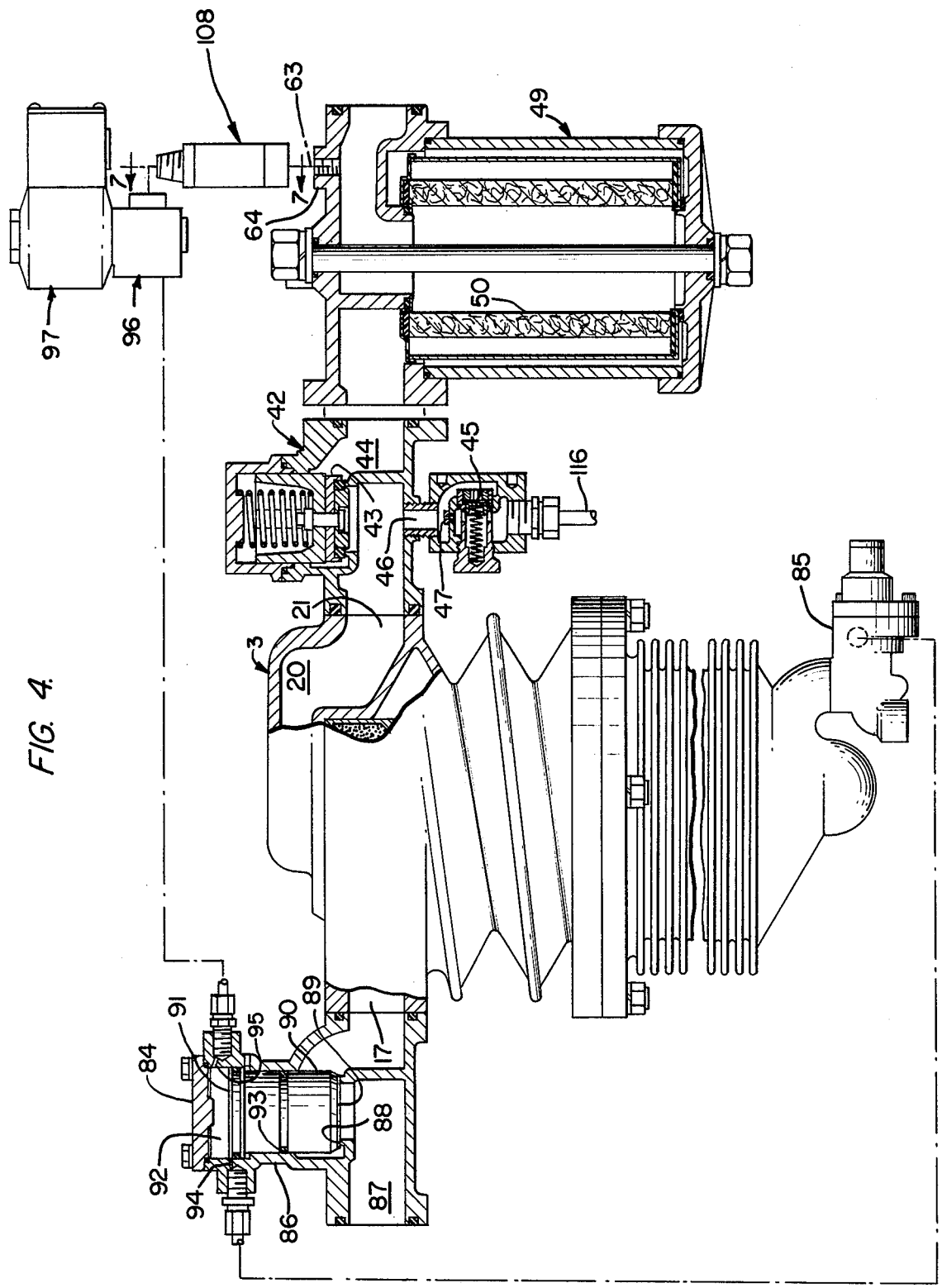
FIG. 4 is a vertical sectional view taken along lines 4 — 4 of FIG. 3 with a solenoid-actuated control valve added and the drain port and valve of the filter unit shown in section.
Figure 5:
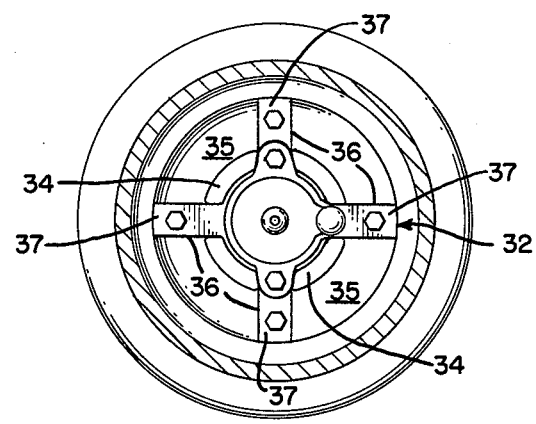
FIG. 5 is a fragmentary horizontal sectional view taken along lines 5 — 5 of FIG. 2.
Figure 7:
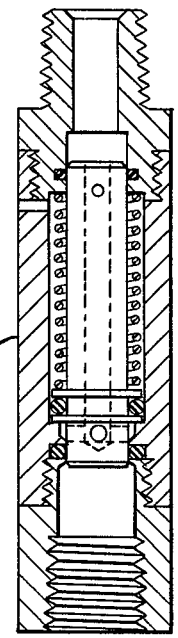
FIG. 7 is a fragmentary vertical sectional view on an enlarged scale taken along lines 7 — 7 of FIG. 4.
Figure 6:
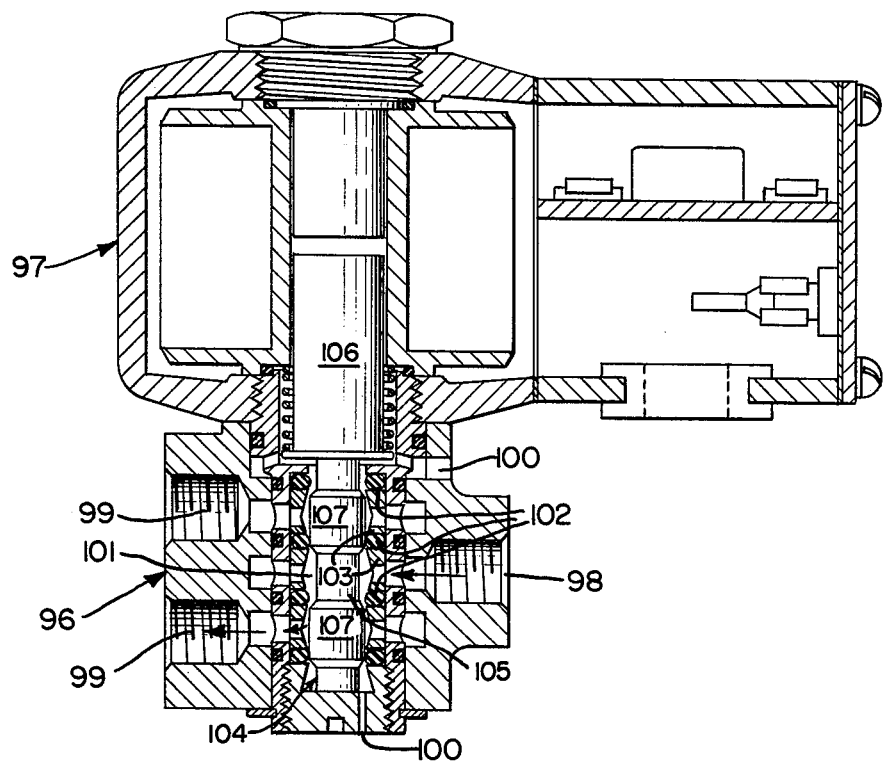
FIG. 6 is a vertical sectional view on an enlarged scale of the solenoid-actuated control valve of FIG. 4.

To adapt them for independent or separate mounting either adjacent or remote from each other, each of the filter units 2 of the second embodiment of FIG. 3 has or is fitted or equipped with an inlet valve 84 and a drain valve 85 individual or discrete thereto. The preferred inlet and drain valves are both one-way valves openable by gas pressure on a differential piston, with the differences that the inlet valve 84 and the drain valve 85 of each unit alternate in opening and closing and that the inlet valve is both opened and closed by gas pressure, while spring pressure closes the more conventional drain valve.

With a body 86 conveniently mounted on the related housing 3 at or in advance of the inlet 17 thereto, the inlet valve 84 of each filter unit 2 has a throughway 87 extending through the body for connecting the inlet to a No. 2 reservoir or other source of compressed air to be filtered and has in the throughway a valve seat 88 through which the unfiltered compressed gas acts on the smaller head 89 of the differential piston 90 for opening the valve and holding it open during the filtering cycle of the particular filter unit 2. The inlet valve 84 is closed during the filter unit's regenerating or drain cycle, by the pressure on the piston's larger head 91 of actuating gas introduced or injected above that head into an actuating gas chamber 92 in the body 86.

As in the first embodiment, the actuating gas for closing the inlet valve 84 is passed through that valve to the drain valve 85 for opening the latter, with the opening delayed until the inlet valve is almost closed for minimizing loss of compressed gas during switching or shifting of the filtering between the filter units 2. In both embodiments, the delay is produced in substantially the same way by an O-ring 93 carried peripherally on the larger head 91 and blocking or sealing the outlet port or outlet 94 of the chamber 92 leading to the drain valve 85 from the chamber's inlet port or inlet 95 until the smaller head 89 is almost seated against the seat 88. Conversely, when the supply of actuating gas to the inlet port 95 is interrupted, the residual actuating gas from both inlet and the drain valves 84 and 85 are bled to atmosphere, the drain valve through the inlet valve.

In the second embodiment, as in the first, the alternate filtering by the filter units 2 is cyclically controlled by a solenoid-actuated valve, in this case the control valve 96, the solenoid 97 of which is energized and de-energized at predetermined intervals by a suitable timer (not shown) in the electrical circuit to the solenoid. The preferred control valve 96 is a 5-way slide valve having an inlet port 98 connected, as by the piping 63, to the tap 64 on the outlet manifold 48 or fine dust filter 49, a pair of spaced outlet ports 99, each connected to the inlet port 95 of the actuating gas chamber 92 in the inlet valve 84 of one of the filter units 2, and a pair of bleed ports 100, each leading from the actuating gas inlet port 95 of one of the filter units for bleeding residual gas therefrom to atmosphere. In the preferred slide valve 96 the inlet and outlet ports 98 and 99 open at axially spaced positions onto a cylindrical slideway or valve chamber 101, conveniently with the inlet port between or bracketed by the outlet ports and each port contained axially of the slideway between a pair of adjoining O-rings 102 spaced, separated, or positioned axially of the slideway by radially perforated cylindrical cages or spacers 103. In turn, the bleed ports 100 open onto opposite ends of the slideway 101.

Alternate connection of the outlet ports 99 to the inlet port 98 for supplying the preferably filtered actuating gas to the inlet valve 84 of one or the other of the filter units 2, is produced or effected by a cylindrical slide 104 reciprocable or shiftable axially of the slideway 101 and having or formed of a stem or spindle 105 concentric or co-axial with and screwed or otherwise connected for axial movement in unison to a plunger 106 of the solenoid 97 and carrying axially spaced spools or drums 107. Each of a length to straddle the gap between and sealingly engage a pair of adjoining O-rings 102, the spools 107 are so positioned relative to each other and the openings of the ports 98 and 99 onto the slideway 101 as in the de-energized position of the solenoid plunger 106 to connect one and, in the energized position, the other of the outlet ports to the inlet port. At the same time that the outlet port 99 adjacent one end of the slideway 101 is connected to the inlet port 98, the bleed port 100 at the opposite end of the slideway is connected to the other or adjoining outlet port, so that any residual actuating gas can be bled back from one of the filter units while the other unit is supplied with actuating gas.

With inlet and drain valves 84 and 85 individual to its filter units 2, and alternate filtering by the units cyclically controlled by the control valve 96, the filter assembly of the second embodiment not only is more flexible in mounting than that of the first, but also is adapted to interrupt or prevent regenerating of the desiccant 8 in either unit and force both units, instead, to filter, whenever, as in starting up a compressor, the pressure of the gas available from the source is temporarily below the range of efficient operation of air brakes or other gas operated devices downstream or at the output of the filter assembly. An effective safeguard in such case is provided by inserting in the actuating gas supply line between the filtered gas tap 64 and the inlet port 98 of the control valve 96, a suitable pressure-sensitive trigger or safety valve 108 adjustable to block passage of actuating gas to the control valve except when the pressure of that gas is within the predetermined acceptable range, which for a diesel locomotive usually will be between 100 and 120 p.s.i.g. (7.03 and 8.44 kg.s.cm.g.). While the supply of actuating gas to it is shut off by the trigger valve 108, the control valve 96 will itself continue to cycle under control of the associated timer, but cannot in turn cause cycling of the filter units 2. Instead, since no actuating gas is then being supplied to the units' actuating gas chambers 92, the inlet valves 84 of both units will be held open by the unopposed pressure of the unfiltered compressed gas from the reservoir or other source and, concurrently, the drain valves 85 of both units will be held closed by the spring forces thereon. Consequently, both filter units 2 will be and remain in a filtering mode until actuating gas at a pressure within the predetermined acceptable range is again available for passing through the trigger valve 108 to the control valve 96.

As mentioned earlier, in each of the filter assemblies of the present invention, each of the dual or pair of filter units 2, during a filtering or operating cycle, has its output of filtered compressed gas divided between a main outlet 44 leading to the one or more gas-operated devices or other users of the output or product gas, and an auxiliary or secondary outlet 46 for passing the part of the output gas used for purging the desiccant 8. Main and auxiliary or purge check valves 43 and 45 block backflow of gas through the outlets 44 and 46 during the unit's purge or regenerating cycle except for the restricted reverse flow of purge gas permitted by the restricted orifice 47 bypassing the purge check valve. These and expansion and reduction in pressure of the reverse-flowing purge gas in passing through the restricted orifice 47, are the functions of the outlet valving 43 and 45.

By contrast, the functions of alternating the filtering between the filter units 2 and causing each filter unit to alternate between filtering and regenerating, so that when one filter unit is filtering or operating, the other is inactive or being regenerated or purged, devolve upon the inlet and drain valving 51 and 52 in the first embodiment and 84 and 85 in the second under the cyclic control of their respective solenoid-actuated pilot and control valves 58 and 96. Thus, each filter unit 2 will be in a filtering mode or condition whenever its inlet port or inlet 17 is open for receiving unfiltered compressed gas from a reservoir or other suitable source and its drain port 33 closed against escape of fluid and, conversely, will be in a regenerating or purging mode or condition when the inlet port is closed and the drain port is open. For purging the desiccant 8 in either of the filter units 2, it is necessary not only that the unit be in a purging mode but also that a supply of filtered compressed gas be available for reverse or backward flow at low pressure through the desiccant. The manner in which the purge gas is made available in the improved dual filter assembly is a particular feature of the present invention.

In both embodiments of the present filter assembly, the filtered gas used for purging is a predetermined part of the product gas diverted during each unit's filtering cycle through the purge outlet port 46 of that unit to a purge or regenerating tank, cylinder or reservoir 109. The preferred purge tank 109 is separate from any other reservoir in the system in which the assembly is incorporated or installed and is common to or shared or used by both of the filter units. However, the purge gas diverted from the two units is not commingled in the purge tank 109 and, instead, is directed or conducted from each unit into one of a pair of separate compartments or chambers 110 into which the tank is divided or partitioned.

The preferred purge tank 109 is cylindrical with opposite ends closed by domed headers or end caps 111 connected and held in place by a piston rod, shaft or bolt 112 extending axially through the tank and itself held in place by nuts 113 on its opposite ends beyond the headers. The tank 109 is divided into the compartments 110 by a floating piston or head 114 slidably mounted on the rod 112 and shiftable or reciprocable therealong, axially of the tank, between the headers 111. Sealed, protected or gasketed against leakage of fluid between and from the compartments 110, suitably by O-rings 115 of appropriate sizes, the purge tank 109 has each compartment connected or coupled through connecting tubing 116 to the purge outlet port 46 of one of the filter units 2 through the adjoining or related header 111.

With the filter units 2 connected through opposite ends of the purge tank 109, each to one of the compartments 110 at opposite sides of the floating piston 114, for flow of compressed gas in both directions therebetween, freely to the tank through the check valve 45 and restrictedly back to the unit through the restricted orifice 47, the filtered compressed gas diverted from the output of either filter unit will progressively expand the related compartment by shifting the floating piston toward the opposite end of the tank. As the piston 114 shifts, the compartment on the opposite side of the piston contracts and gas previously stored therein by the other filter unit is displaced or discharged from that compartment for backward or reverse flow through the restricted orifice 47 of and desiccant 8 in the other filter unit and purges or regenerates that desiccant. Consequently, the common or shared purge tank 109 not only serves as a storage reservoir for the purge gas of each filter unit in turn, but, in releasing or discharging a previously stored charge, acts as a double-acting or reversing pump, the reciprocable piston 114 of which is driven or actuated in each direction by the output gas or fluid pressure from the then filtering filter unit, with the resistance to flow through the restricted orifice of the other unit the only substantial opposing force.

The common purge tank 109, with the interior space between the extreme positions or limits of movement or travel of the floating piston 114 interchangeable between the compartments 110 and alternately available to the filter units 2 for storing purge gas, not only minimizes the exterior space required for such storage but also predetermines by its capacity the maximum volume or quantity of the output gas from each unit divertible for purging. To make full use of that capacity, the cycles of filtering and purging of the filter units ordinarily will be so timed or of such duration as to cover, accommodate or coincide with shift or travel of the floating piston from one limit or extreme position to the other. Additionally, since the force or pressure available for driving purge gas from one of the compartments 110 through the restricted orifice 47 of and the desiccant bed 8 in the filter unit connected to that compartment, will be the substantially uniform or steady force or pressure exerted on the floating piston 114 by the output compressed gas from the then filtering other filter unit, the purge gas will flow through the desiccant bed at a correspondingly uniform rate determined or controlled by the preselected size or area of the orifice 47 relative to the applied pressure, consequently minimizing the duration and maximizing the efficiency of the purging to suit the particular installation.

Except for the safeguard against diverting output gas for purging when the pressure of the supply of unfiltered gas is too low, available only with the second embodiment, the dual filter assemblies of the two illustrated embodiments operate in substantially the same way. Thus, in each embodiment, so long as unfiltered compressed gas is available from a compressor, reservoir or other suitable source, the filter units 2 will alternate jointly in filtering that gas and severally between filtering and purging cycles for maintaining a constant or uninterrupted output of filtered compressed gas for utilization mainly as product gas and partly as purge gas, the latter for regenerating the molecular sieve or other desiccant 8. As preferred, both embodiments depend for automatically alternating or switching between the units on a suitable timer settable or variable to predetermine the on and off or energized and deenergized cycles of the solenoid 60 or 97 of a solenoid-actuated pilot or control valve 58 or 96 acting directly on the inlet valving 51 or 84 and therethrough on the drain valving 52 or 85 of the units.

Capable of filtering both centrifugally and by selective adsorption by a molecular sieve or other suitable desiccant and having loss of compressed gas minimized by the interrelation between the inlet and drain valves such that the drain valve will only open when the inlet valve is almost closed, each filter unit 2 in its purge cycle, with its internal pressure reduced substantially to atmospheric by opening of the drain valve, will receive from the purge tank 109 through the unit's restricted orifice 47 a reverse flow through the desiccant to atmosphere by way of the drain valve. In turn, in furtherance of efficient purging or desorption, the preferred purge tank 109 is adapted to maintain a substantially uniform driving force on the gas discharging from the tank and a correspondingly uniform rate of flow through the desiccant throughout or for the duration of the reverse flow purging.

From the above detailed description it will be apparent that there has been provided an improved dual filter assembly of the desiccant type for filtering compressed gas which is fully automatic in operation, by alternating its filter units at predetermined intervals produces a steady output of filtered gas, and is very efficient in both the filtering by and purging of its units. It should be understood that the described and disclosed embodiments are merely exemplary of the invention and that all modifications are intended to be included that do not depart from the spirit of the invention and the scope of the appended claims.

Having now described my invention, I claim:

1. A filter assembly for compressed gas comprising a pair of filter units connected to a source of unfiltered compressed gas for receiving said gas therefrom, control means for alternating said gas from said source between said filter units, each of said units containing a desiccant, means for alternating each unit between filtering and purging cycles for respectively adsorbing a contaminant from said gas by and regenerating said desiccant, and a purge tank containing a floating piston and divided thereby into a pair of compartments each connected to an outlet of a different one of said units, each of said compartments alternately storing filtered gas from the outlet of the connected filter unit during a filtering cycle thereof and during a purging cycle thereof and under gas pressure from said other compartment discharging said stored gas back to said connected unit for reverse-flow purging of said desiccant therein.

2. A filter assembly according to claim 1, including in the connection of each filter unit to one of the compartments, means for passing filtered gas freely to the compartment and restrictedly back to the filter unit.

3. A filter assembly according to claim 2, wherein the passing means includes a check valve for passing the gas to the compartment and a restricted orifice bypassing said check valve for passing the gas back to the unit.

4. A filter assembly according to claim 3, wherein the purge tank is cylindrical, the piston floats on rod means connecting opposite ends of the tank, and the filter units are connected to the compartments through said ends.

5. A filter assembly for compressed gas comprising a pair of filter units, each having an inlet for receiving compressed gas, a desiccant in said filter unit, inlet valve means for alternately opening said inlets and directing said compressed gas therethrough to said filter units for alternate filtering thereby, each of said units alternating between filtering and purging cycles for respectively adsorbing a contaminant from said gas by said desiccant and regenerating said desiccant by a reverse flow of purge gas therethrough, each unit having a single drain for discharging therefrom both said purge gas and nonadsorbed contaminants accumulated therein, drain valve means for closing and opening said single drain of each unit while said inlet thereof is respectively opened and closed, and means for delaying opening of said drain valve means of each unit until said inlet thereof is closed.

6. A filter assembly according to claim 5, wherein the delaying means is in the inlet valve means.

7. A filter assembly according to claim 5, wherein the inlet and drain valve means each include differential piston means actuated in at least one direction by fluid pressure, and including solenoid-actuated control valve means for controlling actuation of said inlet and drain valve means by passing actuating fluid thereto and therefrom.

8. A filter assembly according to claim 7, wherein the control valve means is a timer cycled solenoid-actuated valve, and the actuating fluid is passed therebetween and the drain valve means through the inlet valve means.

9. A filter assembly according to claim 8, wherein the inlet and drain valve means are each a double-acting valve common to both of said filter units.

10. A filter assembly according to claim 8, wherein the actuating fluid is filtered compressed gas from outlets of said units, and including pressure-responsive valve means between said outlets and an inlet of the control valve for preventing alternate purging of said filter units by blocking flow of said actuating gas to the control valve except when said gas is in a predetermined pressure range.

11. A filter assembly according to claim 5, wherein the inlet and drain valve means are each a pair of valves each for one of said filter units.

* * * * *